(12) United States Patent
Ghosh

(10) Patent No.: US 8,086,850 B2
(45) Date of Patent: Dec. 27, 2011

(54) SECURE GROUP COMMUNICATION AMONG WIRELESS DEVICES WITH DISTRIBUTED TRUST

(75) Inventor: Subhas Kumar Ghosh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1570 days.

(21) Appl. No.: 11/472,828

(22) Filed: Jun. 23, 2006

(65) Prior Publication Data

US 2007/0297613 A1     Dec. 27, 2007

(51) Int. Cl.
*H04L 29/06* (2006.01)
*H04L 9/00* (2006.01)

(52) U.S. Cl. ........................................ 713/163; 380/277

(58) Field of Classification Search ...................... 713/11
See application file for complete search history.

(56) References Cited

U.S. PATENT DOCUMENTS

| | | | |
|---|---|---|---|
| 6,240,188 B1* | 5/2001 | Dondeti et al. | 380/284 |
| 6,584,566 B1* | 6/2003 | Hardjono | 713/163 |
| 6,993,138 B1* | 1/2006 | Hardjono | 380/281 |
| 7,006,449 B2* | 2/2006 | Teraoka | 370/252 |
| 7,213,263 B2* | 5/2007 | Makineni et al. | 726/11 |
| 7,486,795 B2* | 2/2009 | Eschenauer et al. | 380/277 |
| 7,702,905 B2* | 4/2010 | Girao et al. | 713/163 |
| 2003/0133576 A1* | 7/2003 | Grumiaux | 380/279 |
| 2006/0177066 A1* | 8/2006 | Han et al. | 380/277 |

OTHER PUBLICATIONS

Inoue et al. "FDLKH: Fully Decentralized Key Management Scheme on Logical Key Hierarchy" ACNS 2004. pp. 339-354.*
Blom, "An Optimal Class of Symmetric Key Generation Systems", "Advances in Cryptology—Eurocrypt '84, LNCS 209", 1985, pp. 335-338, Publisher: Springer-Verlag, Published in: Berlin.
Blundo, "Perfectly-Secure Key Distribution for Dynamic Conferences", "Lecture Notes in Computer Science", 1993, pp. 471-486, vol. 740, Publisher: Spring-Verlag.
Chan et al., "Random Key Predistribution Shcemes for Sensor Networks", "IEEE Symposium on Research in Security and Privacy", 2003, pp. 197-213, Publisher: IEEE.
Du et al., "A Pairwise Key Pre-Distribution Scheme for Wireless Sensor Networks", "Proceedings of the 10th ACM Conference on Computer and Communication Security", 2003, pp. 42-51, Publisher: ACM. ACM.

(Continued)

*Primary Examiner* — Nathan Flynn
*Assistant Examiner* — Abdullah Almamun
(74) *Attorney, Agent, or Firm* — Fogg & Powers LLC

(57) ABSTRACT

In one embodiment, a method of forming a secure group from a plurality of nodes for communicating with a user A comprises performing a discover protocol, wherein after performing the discover protocol, all nodes belong to at most one small group and wherein all nodes in each small group share a common key. The method further comprises selecting a leader for each small group. The method further comprises, for each of the leaders, generating a respective common key for the user A and that respective leader. The method further comprises generating a key tree having a plurality of levels, wherein the keys for the lowest level of the key tree are the common keys generated for each leader and wherein the keys for each successive layer are generated by combining pairs of keys from lower levels of the key tree.

18 Claims, 17 Drawing Sheets

OTHER PUBLICATIONS

Eschenauer et al, "A Key-Management Scheme for Distributed Sensor Networks", "Proceedings of the 9th ACM Conference on Computer and Communications Security", 2002, pp. 41-47, Publisher: .

Johnson, "The Dynamic Source Routing Protocol (dsr) for Mobile Ad Hoc Networks for IPv4", "http://tools.ieft.org/html/rfc4728", 2007, pp. 1-134, Publisher: The IETF Trust.

Kei et al., "Secure Group Communications Using Key Graphs", "IEEE/ACM Transactions on Networking", Feb. 2000, pp. 16-30, vol. 8, No. 1, Publisher: IEEE.

Liu et al., "Establishing Pairwise Keys in Distributed Sensor Networks", "Proceedings of the 10th ACM Conference on Computer and Communication Security", 2003, pp. 52-61, Publisher: ACM.

Perrig et al., "SPINS: Security Protocols for Sensor Networks", "Wireless Networks", 2002, pp. 521-534, vol. 8, Publisher: Kluwer Academic Publishers, Published in: The Netherlands.

Zhu et al., "Establishing Pair-Wise Keys for Secure Communication in Ad Hoc Networks: a Probabilistic Approach", "11th IEEE International Conference on Network Protocols (ICNP'03)", Nov. 2003, pp. 326-336, Publisher: IEEE.

Zhu et al., "LEAP: Efficient Security Mechanisms for Large-Scale Distributed Sensor Networks", "Proceedings of the 10th ACM Conference on Computer and Communication Security", 2003, pp. 62-72, Publisher: ACM.

* cited by examiner

SECURE GROUP COMMUNICATION AMONG WIRELESS DEVICES WITH DISTRIBUTED TRUST

BACKGROUND

Security is an important issue in wireless networks in general and in wireless sensor networks in particular. Nodes used in a wireless sensor network are typically low-cost, battery-powered, and highly resource constrained. Such wireless sensor nodes typically collaborate with each other in order to accomplish various tasks. Security services such as authentication and key management are critical to secure communication between such wireless sensor nodes in hostile environments. As one of the most fundamental security services, pairwise key establishment enables the wireless sensor nodes to communicate securely with each other using cryptographic techniques. However, due to the resource constraints of such wireless sensor nodes, it is typically not feasible for such wireless sensor nodes to use traditional pairwise key establishment techniques such as public key cryptography or a key distribution center.

One approach to addressing such issues in a wireless sensor network employs a key pre-distribution scheme in which each of n nodes in the network store n−1 random keys. Each node in the network uses the keys to determine the authenticity of other nodes in the network. Such an approach is based on the observation that only np pairwise keys are required to be stored in each node of the network to have a connected random graph with high probability. In other words, if each node in the network can store m keys, then the supportable network size (that is, the number of nodes in the network) is n=m/p, where p is the probability that two nodes share a key. However, with such an approach, the size of the network is strictly limited and adding nodes to the network can be an issue. Other approaches that employ a key pre-distribution scheme while attempting to address such issues tend to substantially increase communication costs, especially when multicast groups are established and maintained in such a network.

SUMMARY

In one embodiment, a method of pre-distributing keys among a plurality of nodes, comprises, for each node, drawing t elements from a pool of elements. The method further comprises selecting a k-variable, t-degree symmetric polynomial. The method further comprises, for each node, evaluating the selected symmetric polynomial using an identifier associated with that respective node; assigning the result of the respective evaluation of selected symmetric polynomial to a key ring associated with that respective node; and assigning the t-elements drawn for that respective node.

In another embodiment, a method of forming a secure group from a plurality of nodes for communicating with a user A comprises performing a discover protocol, wherein after performing the discover protocol, all nodes belong to at most one small group and wherein all nodes in each small group share a common key. The method further comprises selecting a leader for each small group. The method further comprises, for each of the leaders, generating a respective common key for the user A and that respective leader. The method further comprises generating a key tree having a plurality of levels, wherein the keys for the lowest level of the key tree are the common keys generated for each leader and wherein the keys for each successive layer are generated by combining pairs of keys from lower levels of the key tree.

In another embodiment, a system comprises a plurality of nodes, wherein each of the plurality of nodes is operable to communicate with at least a portion of the plurality of nodes. The plurality of nodes are operable to form a secure group from the plurality of nodes for communicating with a user A by doing the following: performing a discover protocol, wherein after performing the discover protocol, all nodes belong to at most one small group and wherein all nodes in each small group share a common key; selecting a leader for each small group; for each of the leaders, generating a respective common key for the user A and that respective leader; and generating a key tree having a plurality of levels, wherein the keys for the lowest level of the key tree are the common keys generated for each leader and wherein the keys for each successive layer are generated by combining pairs of keys from lower levels of the key tree.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

In the following description, embodiments of a key pre-distribution scheme and secure group formation, joining, and leaving scheme are described as being implemented in a wireless sensor network. It is to be understood, however, that the techniques, devices, systems, and methods described here can be implemented in other ways (for example, in other types of wired and/or wireless networks using other types of communication media).

Figure 1:
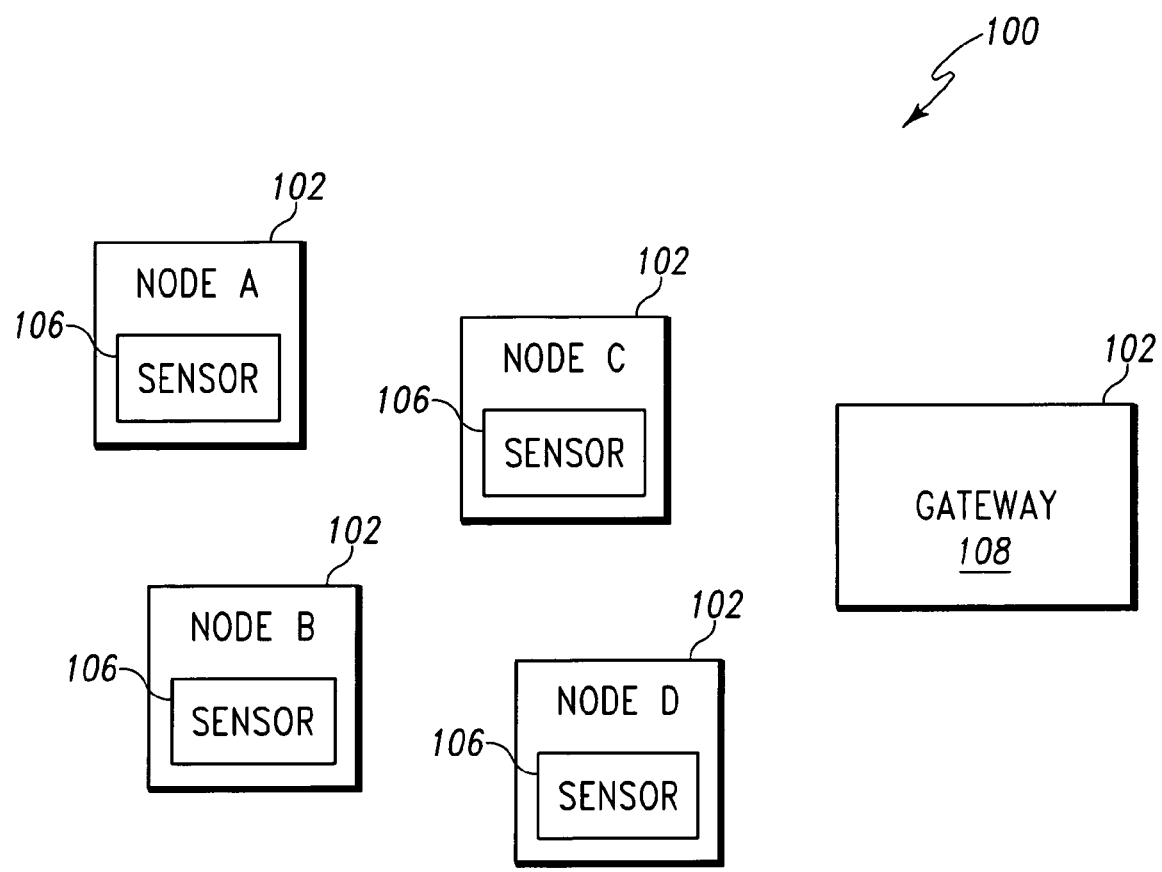
FIG. 1 is a block diagram of one embodiment of a wireless network 100.

FIG. 1 is a block diagram of one embodiment of a wireless network 100. The wireless network 100 comprises a plurality of nodes 102, at least a portion of which communicate with one another over a wireless communication medium. In the particular embodiment shown in FIG. 1, at least a portion of the nodes 102 communicate with one another using radio frequency (RF) wireless communication links. In other embodiments, other types of wireless communication media (for example, infrared wireless communication links) are used instead of or in addition to RF wireless communication links. The nodes 102 of the network 100 are also individually labeled with the letters A through D and are individually referred to here as "node A," "node B," "node C," and "node D."

In the particular embodiment shown in FIG. 1, at least a portion of the nodes 102 are wireless sensor nodes and, as a result, network 100 is also referred to here as "wireless sensor network" 100. Each wireless sensor node includes (or is otherwise coupled to) a sensor 106. Each sensor 106 is capable of generating or obtaining sensor data that is indicative of some physical phenomena. Each wireless sensor node receives sensor data from a respective sensor 106 included in or otherwise coupled to that wireless sensor node. In one implementation of such an embodiment, each wireless sensor node is implemented using the battery-powered wireless sensor node described below in connection with FIG. 2.

In the embodiment shown in FIG. 1, the nodes 102 include at least one gateway node 108 that, in addition to communicating with one or more nodes 102 of the network 100, communicates with a network or device (not shown) external to the wireless network 100 (for example, using a wired or wireless communication link). In other words, the gateway node 108 acts as a gateway between the wireless network 100 and the other external network or device, forwarding data from the wireless network 100 to the external network or device and forwarding data from the external network or device to the wireless network 100.

In the embodiment shown in FIG. 1, the wireless sensor network 100 is implemented as an ad-hoc network using a suitable routing protocol. For example, in one implementation, the wireless sensor network 100 is implemented using a multi-hop routing protocol. Such a multi-hop routing protocol provides a mechanism for a packet (or other unit of data) to be transmitted by a source node to a destination node outside of the wireless transmission range of the source node by transmitting the packet to an intermediate node within the source node's wireless transmission range. The intermediate node then forwards the packet on to the destination node (if the destination node is within the intermediate node's wireless transmission range) or on to another intermediate node within the first intermediate node's wireless transmission range. This forwarding process is repeated until the packet reaches the destination node. For a given node, those nodes with which the given node is able to communicate directly without any hops are referred to here as the "neighbor nodes" or "neighbors" of the given node. Such a routing protocol, in one embodiment (for example, in the embodiment described below in connection with FIG. 2), is implemented in a network layer within each node 102.

In other embodiments, network 100 is implemented in other ways (for example, using other types of nodes and/or routing protocols).

Figure 2:
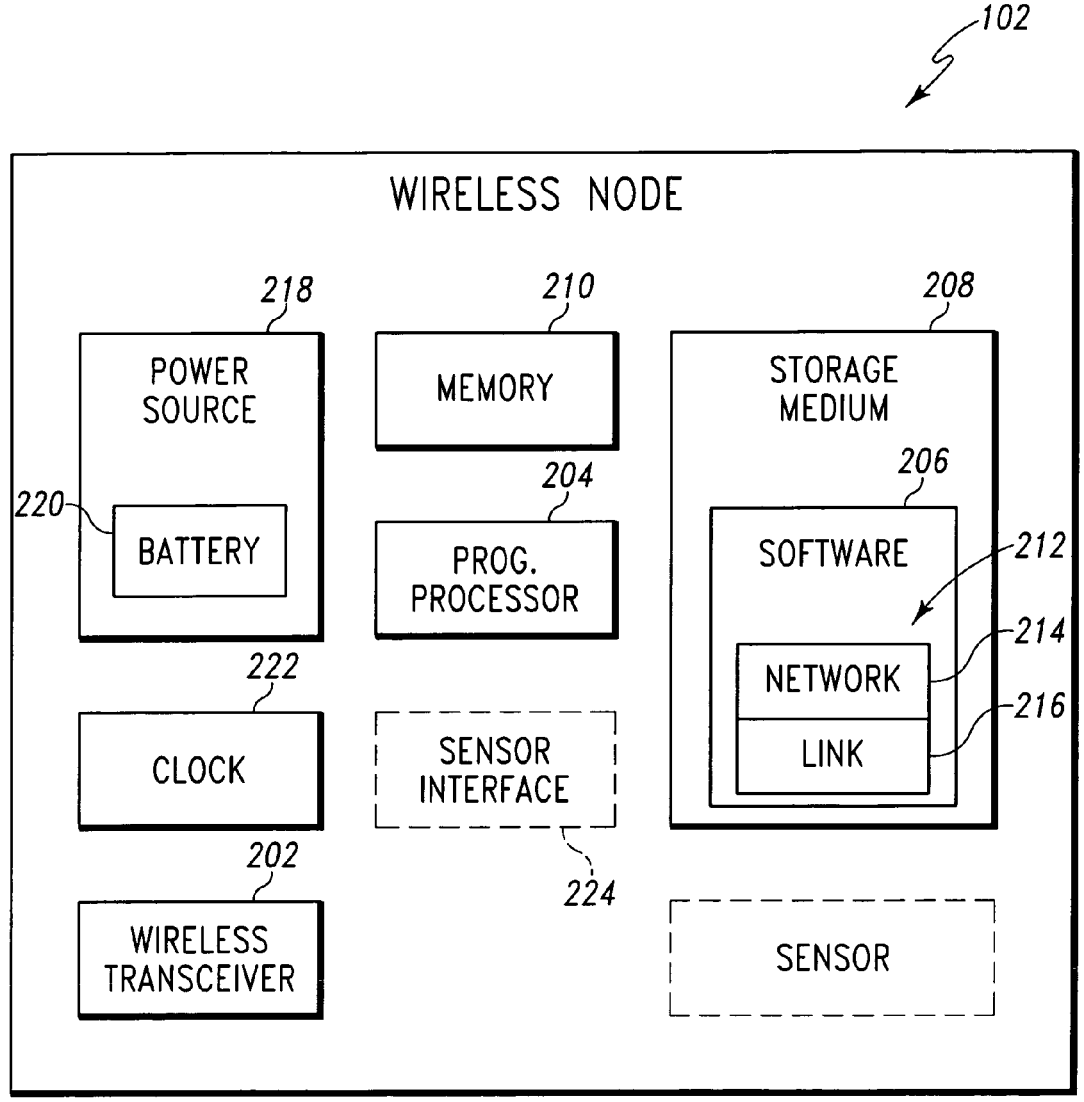
FIG. 2 is a block diagram of one embodiment of a wireless node 102.

FIG. 2 is a block diagram of one embodiment of a wireless node 102. The wireless node 102 shown in FIG. 2 is suitable for use in the embodiment of a wireless network 100 shown in FIG. 1. The wireless node 102 shown in FIG. 2 comprises a wireless transceiver 202 that transmits and receives data over one or more wireless communication links. In one embodiment, the wireless transceiver 202 comprises a RF transceiver that sends and receives data over one or more RF communication links. In other embodiments, the wireless transceiver 202 comprises other types of wireless transceivers for sending and receiving data over other types of wireless communication links (for example, an infrared transceiver for sending and receiving data over infrared communication links) instead of or in addition to an RF transceiver.

The wireless node 102 shown in FIG. 2 further comprises a programmable processor 204 that executes software 206. The software 206 comprises program instructions that, when executed by the programmable processor 204, perform at least a portion of the processing described here as being performed by the wireless node 102. The software 206 is stored (or otherwise embodied) on or in a storage medium 208 (for example, a read-only memory device or flash memory device) from which at least a portion of the software 206 is read by the processor 204 for execution thereby. The wireless node 102 shown in FIG. 2 includes memory 210 in which at least a portion of the software 206 and any data structures used by the software 206 are stored during execution. The memory 210 includes any appropriate type of memory now known or later developed including without limitation, ROM, random access memory (RAM), and a set of registers included within the processor 204. In the particular embodiment shown in FIG. 2, the software 206 comprises a protocol stack 212 that implements at least a portion of the functionality of the Open Systems Interconnect (OSI) protocol stack. In particular, the protocol stack 212 comprises at least a network layer 214 and a data link layer 216 (also referred to here as the "link layer" 216).

The wireless node 102 also comprises a power source 218. In the embodiment shown in FIG. 2, the power source 218 includes a battery 220. In one implementation of the node 102 shown in FIG. 2, the battery 220 of the wireless node 102 cannot be replaced or recharged while the wireless node 102 is deployed in the network 100. In other embodiments, the power source 218 comprises, in addition to or instead of a battery 220, an interface for coupling the wireless node 102 to an external power source such as a source of alternating current (AC) power. The wireless node 102 also comprises a clock 222. The clock 222 is used to provide timing information to the various components of the node 102.

Those nodes 102 that are implemented as wireless sensor nodes include the elements shown in FIG. 2 using dashed lines. Such a wireless sensor node comprises a sensor interface 224 that couples a sensor 106 to the wireless sensor node. In the particular embodiment shown in FIG. 2, the sensor 106 is integrated into the wireless sensor node (for example, by enclosing the sensor 106 within a housing that encloses the sensor 106 along with the other components of the wireless sensor node). In another embodiment, the sensor 106 is not integrated into the wireless sensor node but is otherwise communicatively coupled to the other components of the wireless sensor node via the sensor interface 224.

The sensor 106 is capable of generating or otherwise obtaining data that is indicative of some physical phenomena. Examples of sensors include devices that generate a value indicative of temperature, light, magnetic field, air flow, acceleration, vibration, sound, or power. The sensor interface 224 comprises appropriate interface hardware or software for communicatively coupling the sensor 106 to the other components of the wireless sensor node. For example, in one embodiment, the sensor interface 224 includes, for example, an analog-to-digital converter and/or a software driver for the sensor 106.

One or more of the nodes in the wireless sensor network 100 of FIG. 1 can define a multicast group for sending a set of messages using the methods described below in connection with FIGS. 3-8. For example, a given node (also referred to here as a "sink" or "sink node") may define such a multicast group to be used to propagate a query through the group. In the following description, the following notation is used. The node that intends to define a multicast group is referred to here as "A" or node A and has a set of keys defined by the "keyset (A)∈K". The multicast group defined by node A is referred to here as "$[u_1, u_2, \ldots u_n]_A$". Each generic "user u" has a set of keys in its t-element key ring, which is referred to here as "$[k_1, k_2, \ldots k_\lambda]_u$". In the following description, "$u_1 \Leftrightarrow u_2$" denotes user $u_1$ authenticates user $u_2$ and distributes key $k_{u_{1\text{-}2}}$. In the following description, "x→y:z" denotes, where y is a single user, sending message z from x to y or, where y is group of users, sending message z from x to every user in group y via multicast or unicast. In the following description, $\{m\}_k$, is the encryption of message m (also referred to here as the "encrypted message") under key k.

Also, in the following description, reference is made to a set of k-variable, t-degree polynomials of the form:

$$P(x_1, x_2, \ldots, x_k) = \sum_{j_1, j_2, \ldots, j_k = 0}^{t} a_{j_1, j_2, \ldots, j_k} (x_1)^{j_1} (x_2)^{j_2} \ldots (x_k)^{j_k},$$

where $a_{j_1, j_2, \ldots, j_k} \in GF(q)$ and GF(q) is a finite field. Each such polynomial is symmetric if $P(x_1, x_2, \ldots, x_k) = P(x_{\sigma(1)}, x_{\sigma(2)}, \ldots, x_{\sigma(k)})$ for any permutation $\sigma: \{1, 2, \ldots, k\} \to \{1, 2, \ldots, k\}$. In the following description, an equivalence relation is defined for two such polynomials having the coefficients $a_{i_1, i_2, \ldots, j_k}$ and $a_{j_1, j_2, \ldots, j_k}$, respectively, where the two polynomials are equivalent if $i_1, i_2, \ldots i_k$ is a permutation of $j_1, j_2, \ldots j_k$. In a symmetric polynomial, all pairs of corresponding coefficients are equal. In a k-variable, t-degree symmetric polynomial, the number of all coefficients that are not pairwise equivalent is equal to the number of possible ways of choosing repetitions of k elements from a set of (t+1) elements. Thus to generate a symmetric polynomial in k-variable of t-degree with coefficients in GF(q), it is enough to randomly select only $$\binom{k+t}{k}$$

values from GF(q).

A random key-graph is defined as a directed acyclic graph, having u-nodes, representing users (shown in FIGS. 4A-4F using squares), and k-keys, representing keys (shown in FIGS. 4A-4F using circles). A secure sensor group is defined here as G=⟨U, K, C, R⟩ where U is a finite set of users, K is a finite set of keys, $C \subset 2^U$ is the group of nodes that are in communication range of one another, and $R \subset U \times K$, is the pair denoting the binary relationship between U and K referred to here as the "user-key" relationship. User u has key k if and only if (u,k) is in R.

In the embodiments described below, the preliminary keying of the network is done through random pre-distribution where the following is true: (i) there is a one-to-one correspondence between U and the set of u nodes in G; (ii) there is a one-to-one correspondence between K and the set of k keys in G; (iii) (u, k) ∈R, if and only if there is a directed path from the u-node that corresponds to u to the k-node that corresponds to k, where the pre-distribution is random and the existence of the elements in R is based on internal coin tosses of the pre-distribution algorithm; (iv) there is a function "userset: k→u", such that (u, k) ∈R and userset(k) ∈U are those nodes that share a common key k; (v) there may or may not be an element in C, which is a subset of userset(k); (vi) there is a function "keyset: u→k", such that (u, k) ∈R and keyset(u) ∈K.

Figure 3:
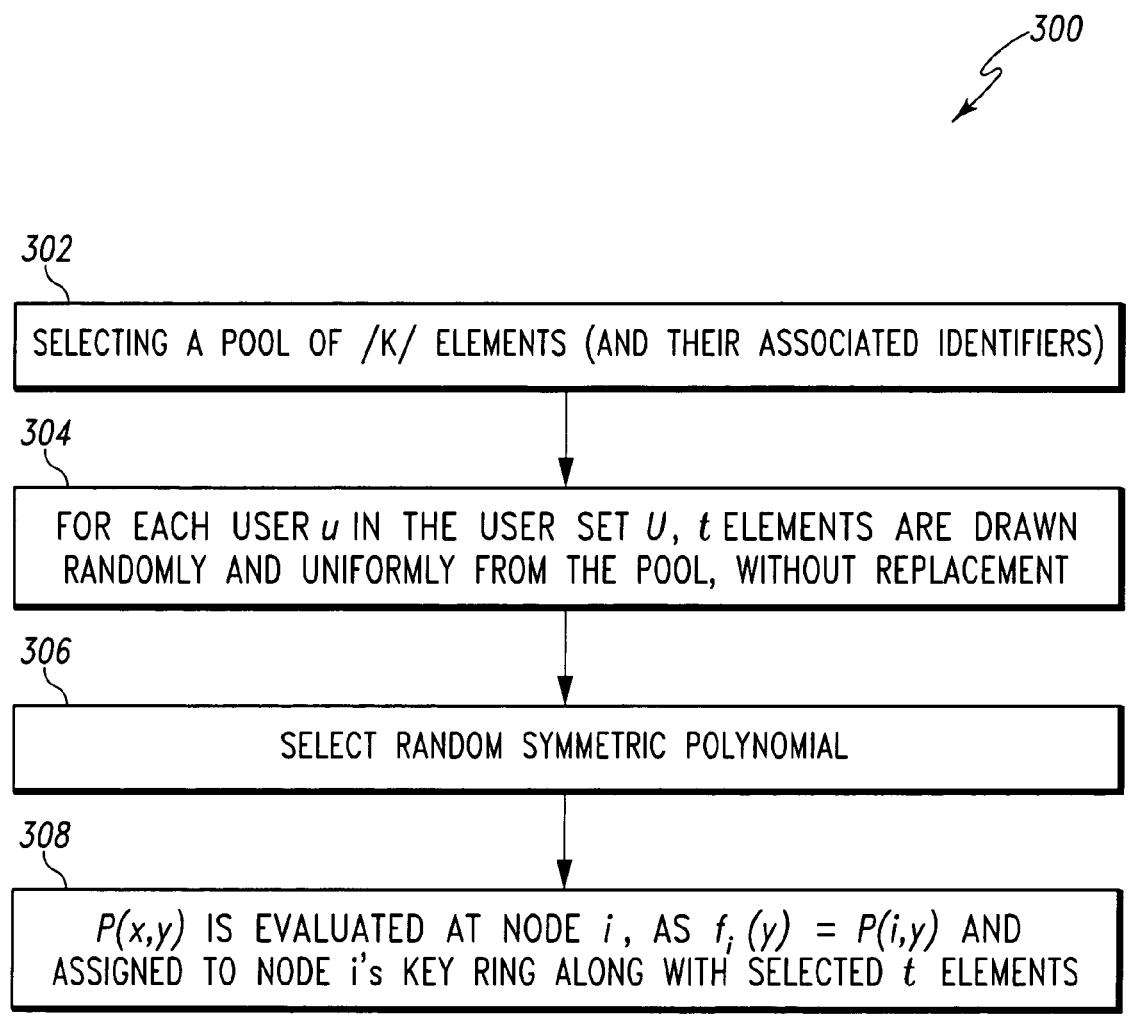
FIG. 3 is a flow diagram of one embodiment of a method 300 of pre-distributing keys in a wireless network.

FIG. 3 is a flow diagram of one embodiment of a method 300 of pre-distributing keys in a wireless network. The particular embodiment of method 300 is described here as being implemented in the wireless sensor network 100 of FIG. 1 and using the wireless node 102 of FIG. 2 (though it is to be understood that other embodiments are implemented in other ways). In such an embodiment, before the various nodes 102 of the network 100 are deployed, method 300 is performed as an off-line process for each user u in the set of users U, where each node 102 in the network 100 is considered a separate user u.

Method 300 comprises selecting a pool of |K| elements (and their associated identifiers) (block 302). The selected elements are randomly chosen over GF(q). Then, for each user u in the user set U, t elements are drawn randomly and uniformly from the pool, without replacement, where t is much smaller than the total size of the pool (block 304). And the selected t elements for each user u are considered to be the key ring for that user u. Then, a symmetric polynomial P(x,y) of degree t with coefficients over GF(q), is selected by randomly choosing the coefficients over GF(q) where q>n (block 306). That is, one such polynomial P(x,y) is selected for all the users in the user set U For each user u in the user set U (having an associated node i), P(x,y) is evaluated at i, as $f_i(y)=P(i,y)$, and $f_i(y)=P(i,y)$ is assigned to that node's key ring, along with that node's selected t elements (and the associated identifiers of the selected t elements) (block 308). It should be noted that if two nodes i and j share one element (from the selected t elements) from each node's respective key rings, the two nodes i and j can form t different keys by replacing the same coefficient from both $f_i(y)=P(i,y)$ and $f_j(y)=P(j,y)$ with the common element from their key rings. This way all the unique elements that exist in |K| and the resulting combinations thereof using such polynomials form different key-spaces. In such an embodiment, the storage cost at each node is ((t+1)(t+2)/2+ m)log(q) bits. As noted above, to generate a symmetric polynomial in k-variable of t-degree with coefficients in GF(q), it is enough to randomly select only $$\binom{k+t}{k}$$

values from GF(q), with the elements from t-element key ring, two nodes can replace some equivalent coefficients at the symmetric location and generate a new polynomial-based conference key space. This way the number of possible keys spaces increases dramatically with size efficiency.

Figure 4A:
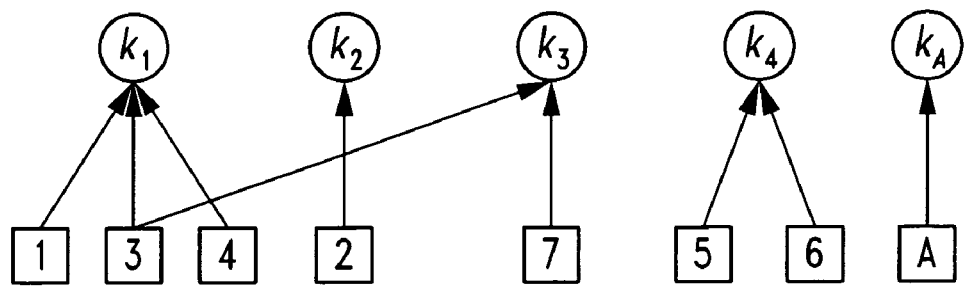
FIGS. 4A-4G are key-graph diagrams illustrating one example of the operation of the methods described here.

FIGS. 4A-4G are key-graph diagrams illustrating one example of the operation of the methods described here. FIG. 4A illustrates the results of the operation of method 300 in such an example. In the example shown in FIG. 4A-4G, there are seven nodes (labeled "1" through "7") and, after the operation of the pre-distribution method 300, nodes 1, 3, and 4 share key $k_1$, node 2 has a key $k_2$ that is not shared with any other nodes, nodes 3 and 7 share key $k_3$, nodes 5 and 6 share key $k_4$. User A has a key $k_A$.

After keys have been pre-distributed and the nodes are deployed and online, the nodes in a wireless network participate in a key exchange in which each node i determines which keys in its key ring, if any, it has in common with each other node j with which node i is able to communicate. FIGS.

5A-5E are flow diagrams of five respective methods of exchanging keys in a wireless network. Each of the methods shown in FIGS. 5A-5E are described here as being implemented in the wireless sensor network 100 of FIG. 1 and using the wireless node 102 of FIG. 2 (though it is to be understood that other embodiments are implemented in other ways). In such embodiments, each method is performed by each wireless node 102 in the network 100. In one implementation of such an embodiment, at least a portion of the processing of each method described below in connection with FIGS. 5A-5E is implemented in software 206 that is executing on each wireless node 102 in the network 100.

Figure 5A:
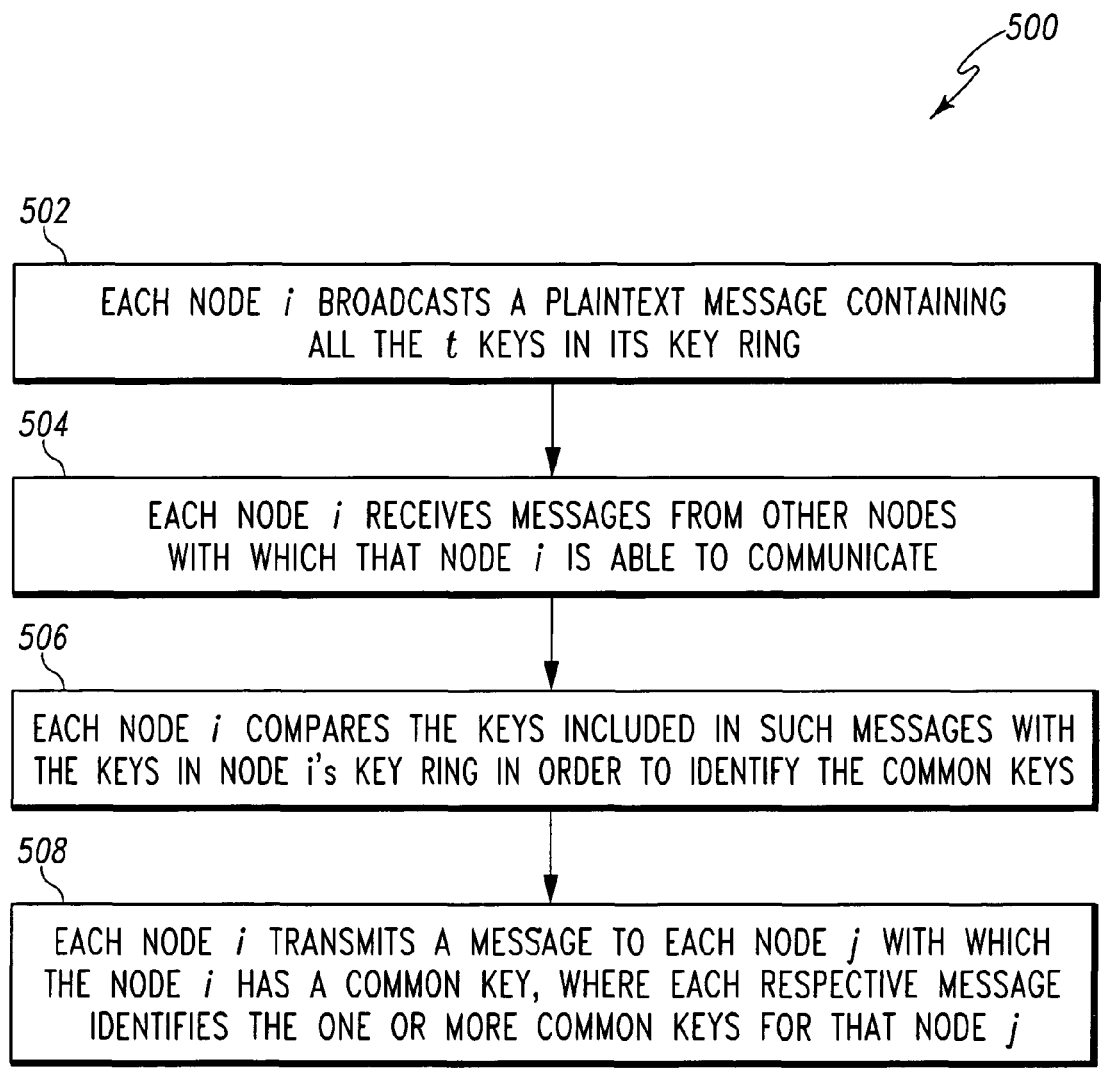
FIGS. 5A-5E are flow diagrams of five respective methods of exchanging keys in a wireless network.

A first embodiment of a key-exchange method 500 is shown in FIG. 5A. In the embodiment shown in FIG. 5A, such key exchange occurs by having each node i broadcast (in plaintext) a message containing all the t keys in its key ring (block 502). Also, each node i receives similar broadcasts from other nodes with which that node i is able to communicate (block 504) and compares the keys included in such broadcasts with the keys in node i's key ring in order to identify the common keys (block 506). Each node i transmits a message to each node j with which the node i has a common key, where each respective message identifies the one or more common keys for that node j (block 508). Such an embodiment is considered to be "interactive" since the various nodes of the wireless sensor network interact with each other during key exchange.

Figure 5B:
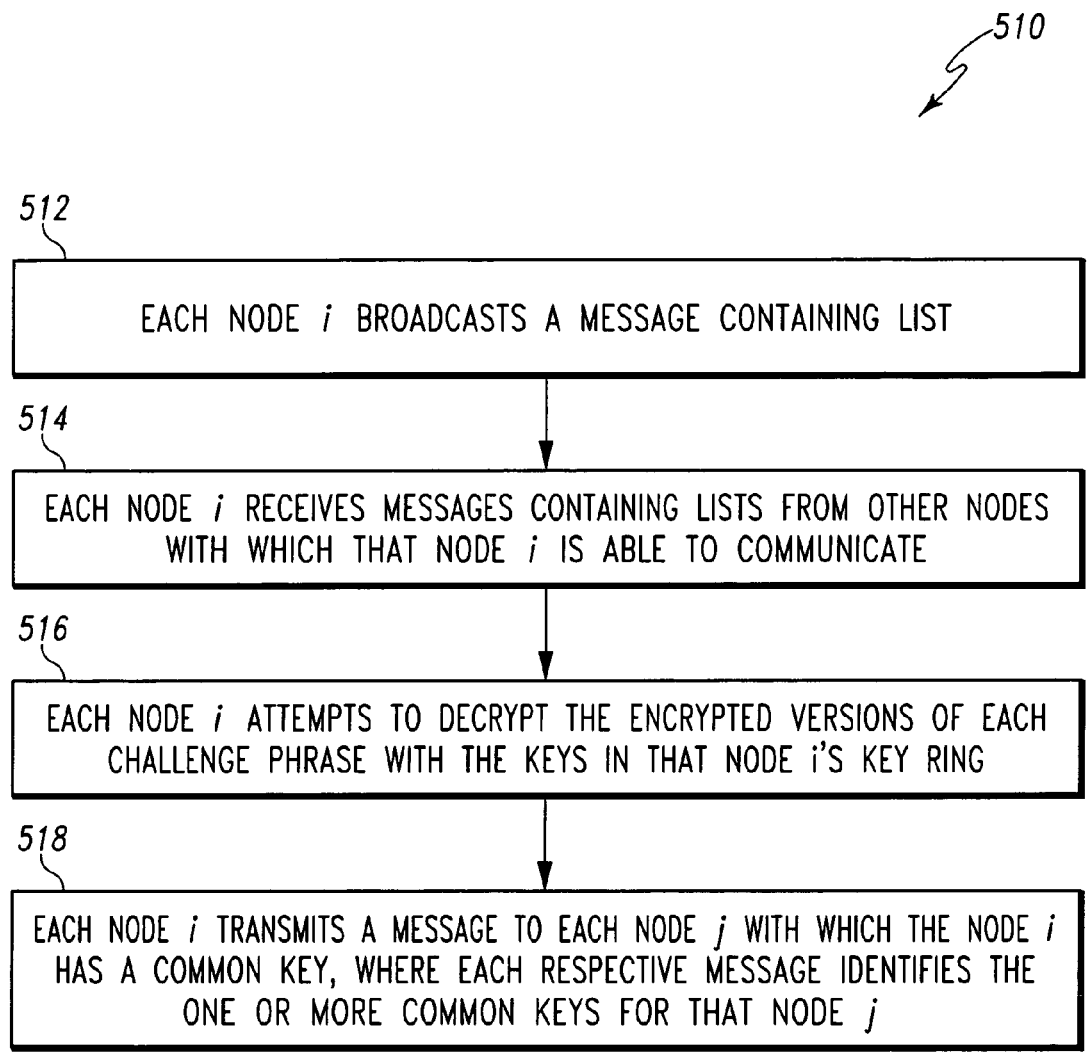

A second embodiment of a key-exchange method 510 is shown in FIG. 5B. The particular embodiment shown in FIG. 5B is an interactive scheme in which each node i in the wireless network 100 broadcasts a message containing a list defined as: $\alpha$, $E_{K_v}(\alpha)$, $v=1, 2, \ldots, t$ (block 512). In such an embodiment, $\alpha$ is a plaintext version of a challenge phrase, each $E_{K_v}(\alpha)$ is a respective encrypted version of the challenge phrase $\alpha$ using key $K_v$ from node i's key ring, and the resulting list is a concatenation of the plaintext version of the challenge phrase $\alpha$, and the t encrypted versions of the challenge phrase $E_{K_v}(\alpha)$. Also, during this key-exchange process, each node i receives messages containing such lists $\alpha$, $E_{K_v}(\alpha)$, $v=1, 2, \ldots, t$ from each of the other nodes in the wireless network 100 that are within the communication range of that node i (block 514) and attempts to decrypt the encrypted versions of each challenge phrase with the keys in that node i's key ring (block 516). That is, for each list $\alpha$, $E_{K_v}(\alpha)$, $v=1, 2, \ldots, t$ received at a given node i from another node j in the wireless sensor network 100, the node i successively attempts to decrypt each encrypted version of the challenge with successive keys from the node i's key ring until it finds a key that successfully decrypts that encrypted version of the challenge (that is, there is a match with the plaintext version of the challenge phrase) or has tried each key in node i's key ring. In this way, each node i is able to identify any keys that node i has in common with each node j with which node i is able to communicate. Then, node i transmits a message to each node j with which the node i has a common key, where each respective message identifies the one or more common keys for that node j (block 518).

Figure 5C:
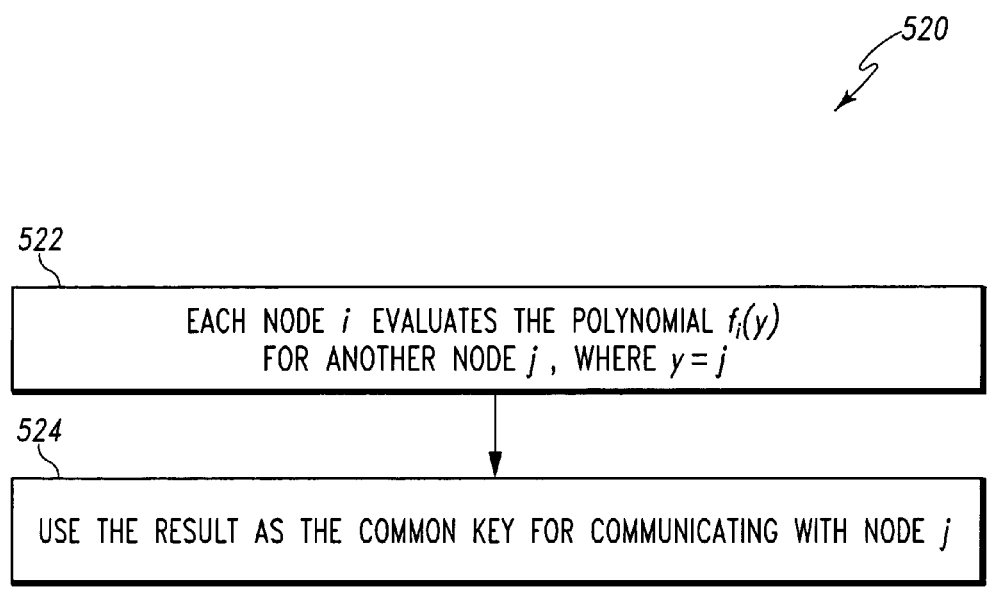

A third embodiment of a key-exchange method 520 is shown in FIG. 5C. The particular embodiment shown in FIG. 5C is a non-interactive scheme in which each node i in the wireless network 100 evaluates the polynomial $f_i(y)$ for another node j, where $y=j$ (block 522) and uses the result as the common key for communicating with node j (block 524). It should be noted that node j will also perform the processing of method 520 and evaluate the polynomial $f_j(y)$ for node i, where $y=i$. The common key is the results of such evaluations $f_i(y)=f_j(y)=s_{ij}$.

Figure 5D:
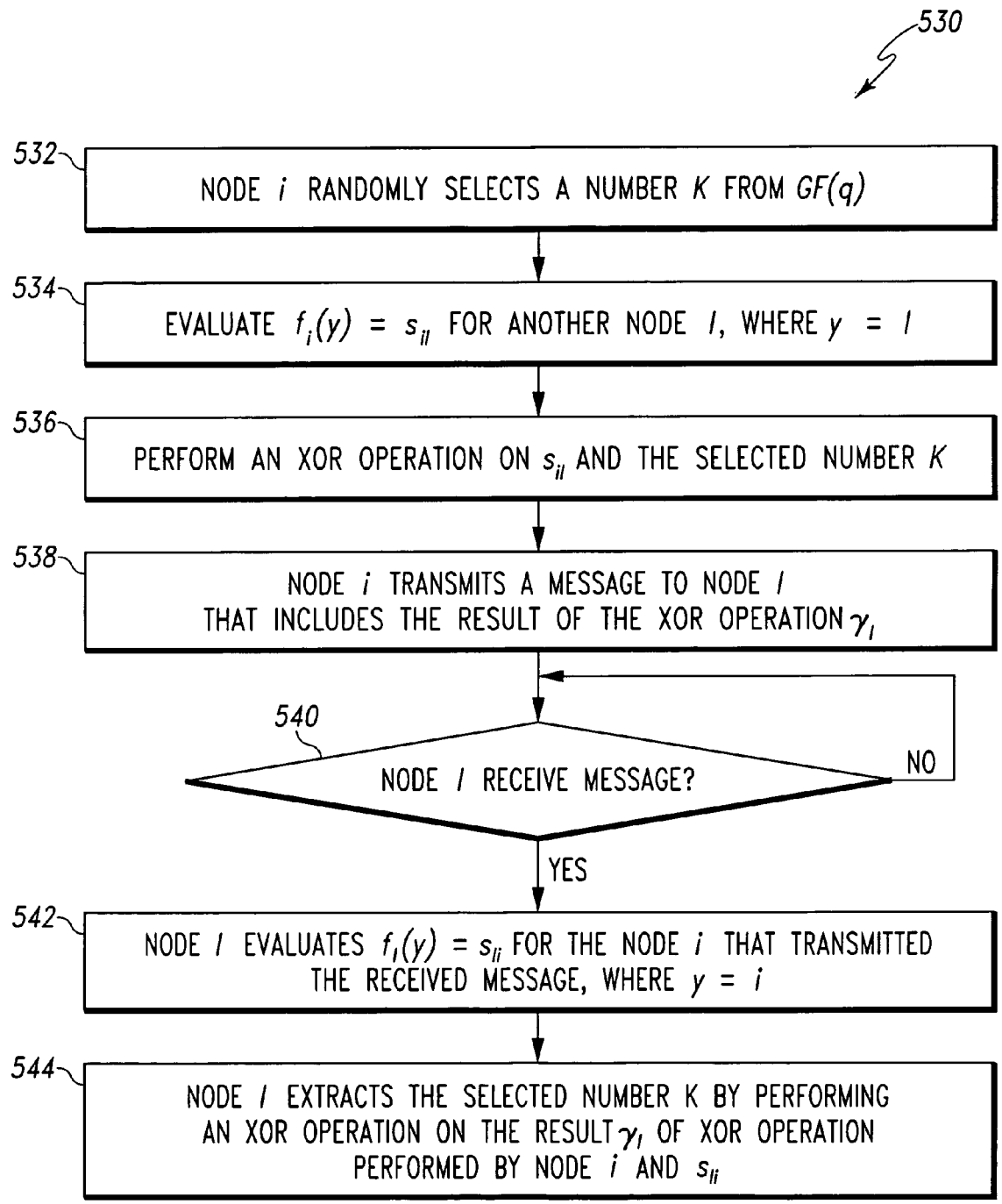

A fourth embodiment of a key-exchange method 530 is shown in FIG. 5D. The particular embodiment shown in FIG. 5D is an interactive scheme. In such an embodiment, a node i in the wireless network 100 randomly selects a number K from GF(q) (block 532) and evaluates $f_i(y)=s_{il}$ for another node l, where $y=l$ (block 534). Then, node i performs an "exclusive OR" (that is, an XOR) operation on $s_{il}$ and the selected number K (block 536). That is, $\gamma_l = K \oplus s_{il}$. Then, node i transmits a message to node l that includes the result of the XOR operation $\gamma_l$ (block 538).

In such an embodiment, when and if node l receives such a message (checked in block 540), node l evaluates $f_l(y)=s_{li}$ for the node i that transmitted the received message, where $y=i$ (block 542). Node l extracts the selected number K (which was selected by node i) by performing an XOR operation on the result $\gamma_l$ of XOR operation performed by node i and $s_{li}$ (block 544). That is, $K = \gamma_l \oplus s_{li}$. Thereafter, nodes i and l use the selected number K as the pairwise key for communication therebetween.

Figure 5E:
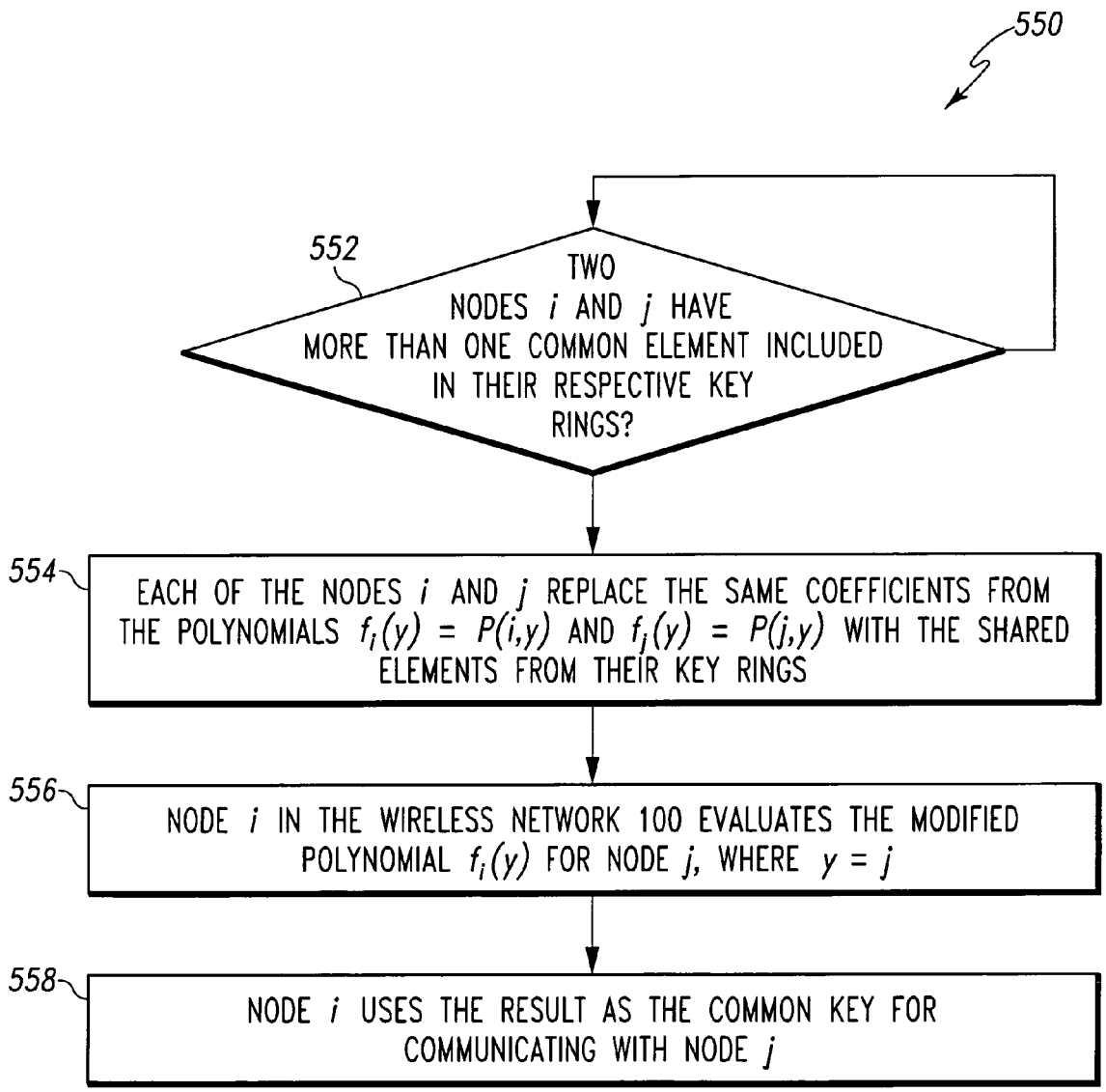

A fifth embodiment of a key-exchange method 550 is shown in FIG. 5E. The particular embodiment shown in FIG. 5E is a non-interactive scheme that is used when two nodes i and j have more than one common element included in their respective key rings (checked in block 552). Each of the nodes i and j replace the same coefficients from the polynomials $f_i(y)=P(i,y)$ and $f_j(y)=P(j,y)$ with the shared common elements from their key rings (block 554). Node i in the wireless network 100 evaluates the modified polynomial $f_i(y)$ for node j, where $y=j$ (block 556) and uses the result as the common key for communicating with node j (block 558). Node j also evaluates its modified polynomial $f_j(y)$ for node i, where $y=i$. The common key is the results of such evaluations of the modified polynomials $f_i(y)=f_j(y)=s_{ij}$.

Figure 6:
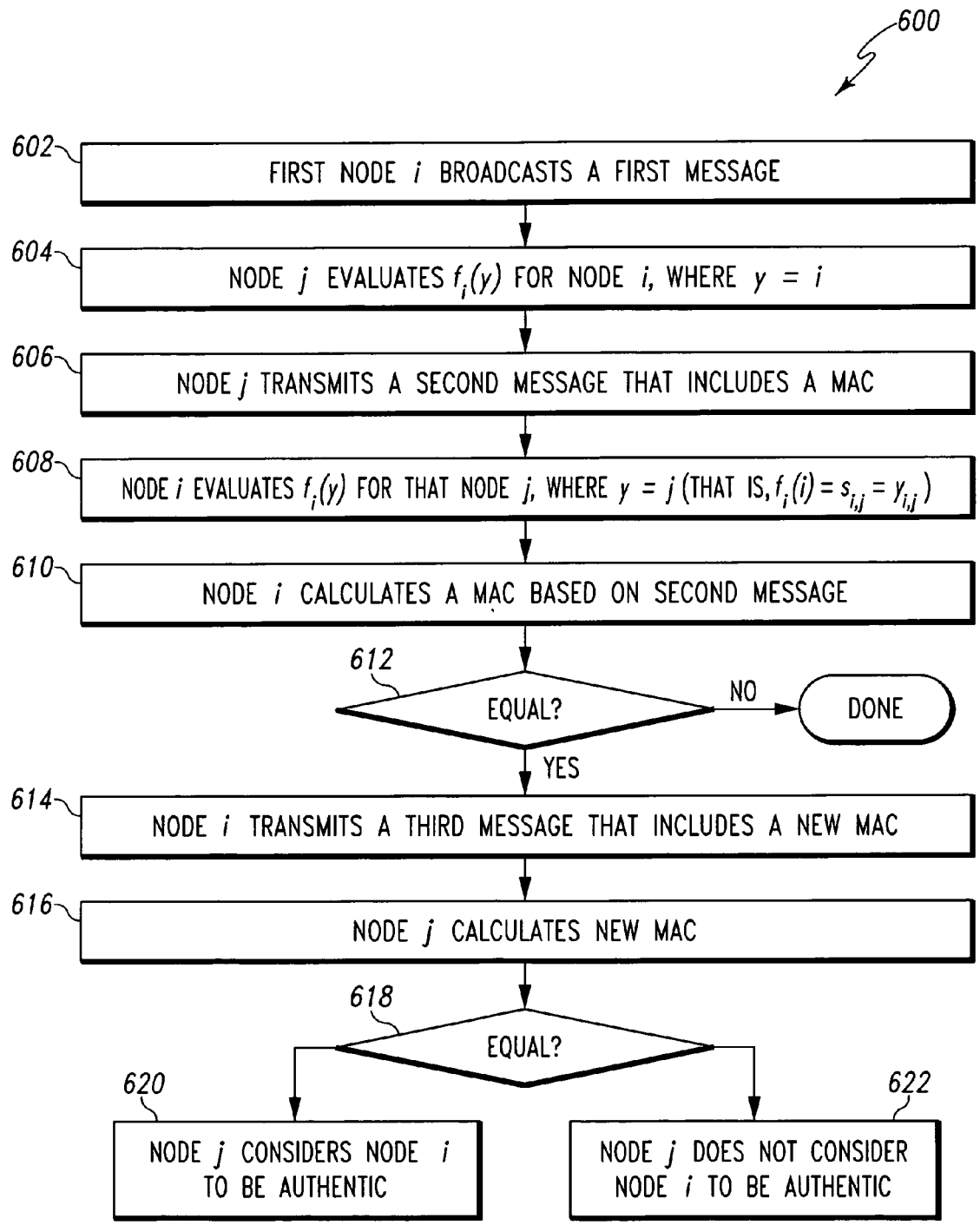
FIG. 6 is a flow diagram of one embodiment of a method 600 of authenticating common keys that are used by a pair of nodes in a wireless network.

FIG. 6 is a flow diagram of one embodiment of a method 600 of authenticating common keys that are used by a pair of nodes in a wireless network. The embodiment of method 600 shown in FIG. 6 is described here as being implemented in the wireless sensor network 100 of FIG. 1 and using the wireless node 102 of FIG. 2 (though it is to be understood that other embodiments are implemented in other ways). In such an embodiment, method 600 is performed by each wireless node 102 in the network 100. In one implementation of such an embodiment, at least a portion of the processing of method 600 is implemented in software 206 that is executing on each wireless node 102 in the network 100.

In such an embodiment, a first node i in the wireless sensor network 100 broadcasts a first message $N_i$, i that includes a nonce $N_i$ generated by that node i and includes that node i's node id (block 602). A node j that receives the first message $N_i$, i broadcast by node i evaluates $f_j(y)$ for node i, where $y=i$ (that is, $f_j(i)=s_{j,i}=\gamma_{j,i}$) (block 604). Node j then transmits a second message $N_j$, j, $MAC(N_i \| N_j \| j \| i)_{\gamma_{j,i}}$ that comprises a nonce $N_j$ generated by that node j, the node id for node j, and a message authentication code (MAC) (block 606). In one implementation of the embodiment shown in FIG. 6, MAC$(N_i \| N_j \| j \| i)_{\gamma_{j,i}}$ is the result of a one-way hash function that is performed using the key $\gamma_{j,i}$ on a string that is a concatenation of the nonce $N_i$ (which is extracted from the first message received by node j from node i), the nonce $N_j$, the node id for node j, and the node id for node i.

If and when node i receives the second message that includes $N_j$, j, $MAC(N_i \| N_j \| j \| i)_{\gamma_{j,i}}$, node i evaluates $f_i(y)$ for node j, where $y=j$ (that is, $f_i(j)=s_{i,j}=\gamma_{i,j}$) (block 608) and calculates $MAC(N_i \| N_j \| j \| i)_{\gamma_{i,j}}$ (block 610). Node i calculates $MAC(N_i \| N_j \| j \| i)_{\gamma_{i,j}}$ using the same one-way hash function used by node j to calculate $MAC(N_i \| N_j \| j \| i)_{\gamma_{j,i}}$. The one-way hash function is performed using the key $\gamma_{i,j}$ on a string that is a concatenation of the nonce $N_i$, the nonce $N_j$ (which is extracted from the second message received by node i from node j), the node id for node j, and the node id for node i. If $MAC(N_i||N_j||j||i)_{\gamma_{j,i}}$ equals $MAC(N_i||N_j||i||i)_{\gamma_{i,j}}$ (checked in block 612), then node i transmits a third message that includes $MAC(N_j||i)_{\gamma_{i,j}}$ (block 614). $MAC(N_j||i)_{\gamma_{i,j}}$ is calculated using the one-way hash function and the key $\gamma_{i,j}$ on a string that is a concatenation of the nonce $N_j$ and the node id for node i.

If and when node j receives the third message that includes $MAC(N_j||i)_{\gamma_{i,j}}$ node j calculates $MAC(N_j||i)_{\gamma_{j,i}}$ (block 616). $MAC(N_j||i)_{\gamma_{j,i}}$ is calculated using the one-way hash function and the key $\gamma_{j,i}$ on a string that is a concatenation of the nonce $N_j$ (which node j previously generated) and the node id for node i. If $MAC(N_j||i)_{\gamma_{i,j}}$ equals $MAC(N_j||i)_{\gamma_{j,i}}$ (checked in block 618), node j considers node i to be authentic (block 620); otherwise, node j does not consider node i to be authentic (block 622).

Figure 7A:
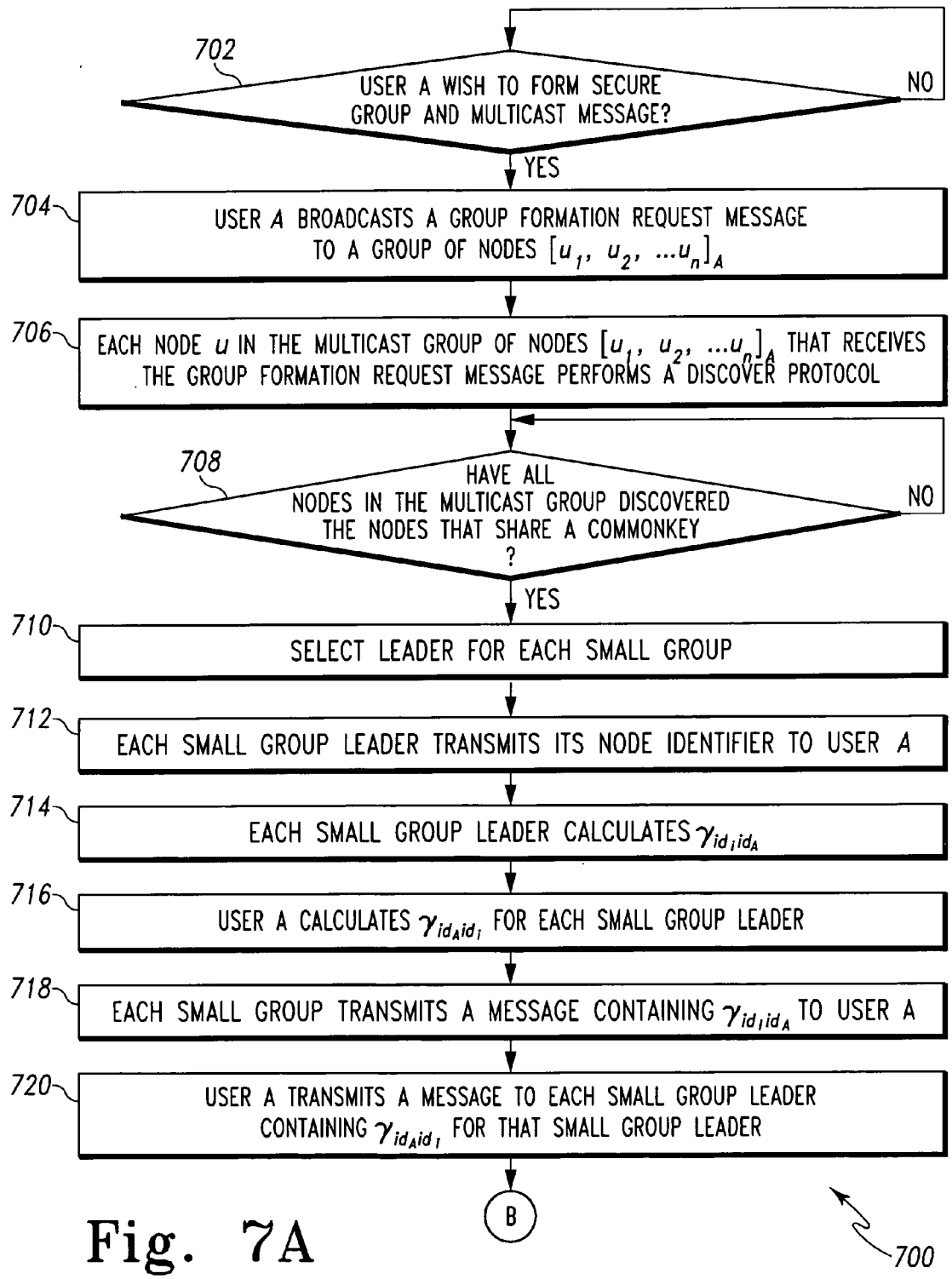
FIGS. 7A-7B are flow diagrams of one embodiment of a method 700 of forming a secure group.
Figure 7B:
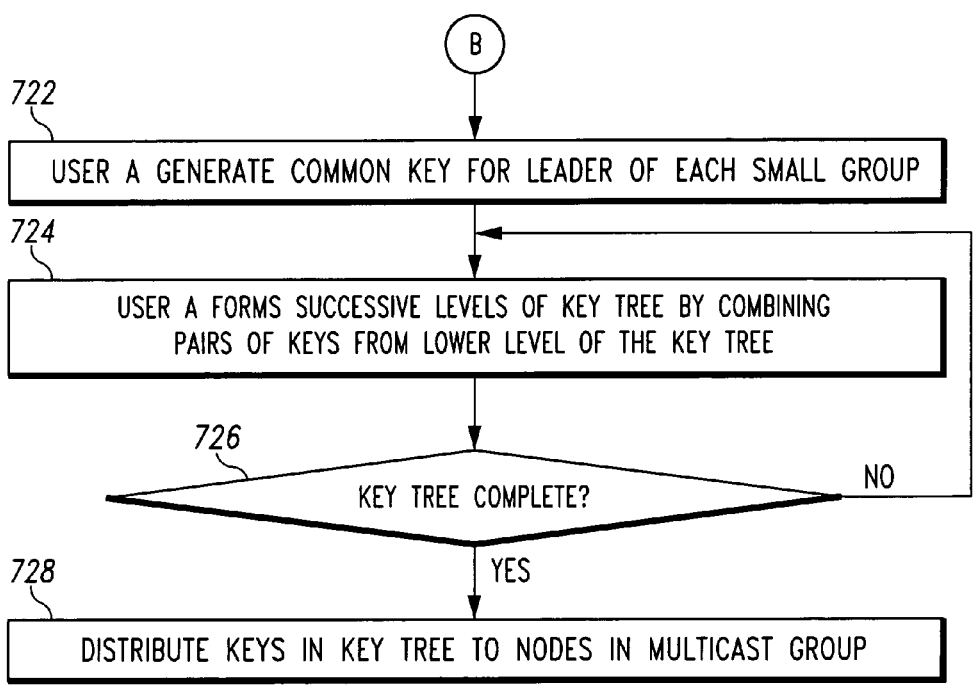

FIGS. 7A-7B are flow diagrams of one embodiment of a method 700 of forming a secure group. The embodiment of method 700 shown in FIGS. 7A-7B is described here as being implemented in the wireless sensor network 100 of FIG. 1 and using the wireless node 102 of FIG. 2 (though it is to be understood that other embodiments are implemented in other ways). In such an embodiment, method 700 is performed by each wireless node 102 in the network 100. In one implementation of such an embodiment, at least a portion of the processing of method 700 is implemented in software 206 that is executing on each wireless sensor node 102 in the network 100.

The processing of method 700 can be used, for example, when a wireless sensor network 100 is first installed, where "secrets" have been pre-distributed as described above in connection with FIG. 3. When the processing of method 700 is performed, each wireless sensor node 102 has a key ring and has exchanged keys with and established a MAC for each other node in the network 100 with which the wireless sensor node 102 is able to communicate.

When a user A wishes to form a secure group and multicast a message to the secure group (checked in block 702 of FIG. 7A), the user A broadcasts a message containing a request to a group of nodes $[u_1, u_2, \ldots u_n]_A$ (block 704). Such a message is also referred to here as the "group formation request message." In various implementations of such an embodiment, user A expresses such a "wish" directly (for example, where user A specifically identifies the particular nodes in the group), indirectly (for example, where user A wishes to communicate with all nodes located within a particular geographic region identified by user A, for example, by specifying an "x-y" location and a diameter value), or both. In general, in such an embodiment, the group of nodes $[u_1, u_2, \ldots u_n]_A$ are identified using appropriate lower-layer functionality included in the node used by user A. This group is also referred to here as the "multicast group."

Each node u in the multicast group of nodes $[u_1, u_2, \ldots u_n]_A$ that receives the group formation request message performs a discover protocol (block 706). The discover protocol is performed in a local neighborhood of each such node u, via local broadcast, to form one or more "small" groups that satisfy the following criteria: (1) all nodes belong to at most one such small group; (2) all nodes in such a small group share a common key; (3) if U' is such a small group, then $\forall u_1, u_2 \in U'$, at least one key $k_{i-j}$ is common, and $[u_1, u_2] \in C$; and (4) a small group may contain only one node, as a particular node may not be able to find any other node in its neighborhood.

In the embodiment shown in FIGS. 7A-7B, when performing the discover protocol, each node u broadcasts a message that includes the key identifiers for all of the keys in the t-element key ring of that node u (that is, $[k_1, k_2, \ldots k_\lambda]_u$) to the other nodes in the local neighborhood of node U. Such a broadcast is also referred to here as a "key identifier message" that is locally broadcast (that is, broadcast to other nodes in the local neighborhood of the node u). Each node $u \in [u_1, u_2, \ldots u_n]_A$ need only locally broadcast each key identifier in its t-element key ring once to its neighbor nodes. In such an embodiment, the disclosure of the key identifiers for each key does not reveal anything about that key.

Each node in the local neighborhood of node u that receives such a key identifier message (also referred to in this context as the "receiving node") checks if a key identifier included in the received key identifier message matches a key identifier of a key included in the receiving node's t-element key ring. If that is the case and the receiving node is not already part of another small group, the receiving node sends a reply message to node u indicating that the receiving node would like to join node u's small group (where the common key is $k_a \in [k_1, k_2, \ldots k_\lambda]_u$). That is, if node u is already a member of another small group, "node u's small group" is that small group of which node u is already a member. If node u is not a member of any small group, then "node u's small group" is a "new" small group that includes as its initial members node u and the receiving node.

Figure 4B:
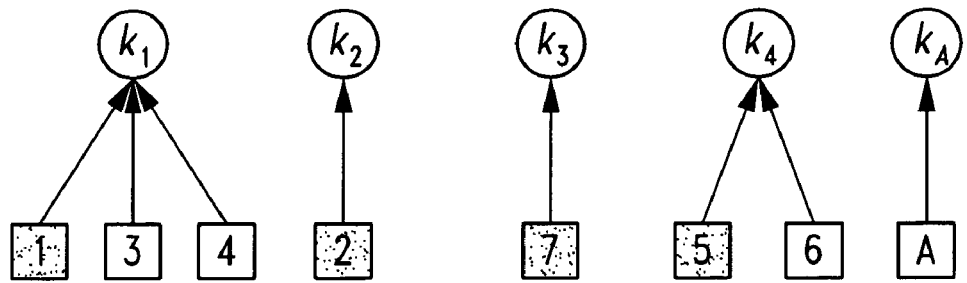

FIG. 4B illustrates the results of the operation of such a discover protocol the example illustrated in FIGS. 4A-4G. As shown in FIG. 4B, after the operation of the discover protocol, nodes 1, 3, and 4 are members of a first small group with common key $k_1$ and node 1 as leader, node 2 is a member of a second small group with common key $k_2$ and node 2 as leader, node 7 is a member of a third small group with common key $k_3$ and node 7 as leader, nodes 5 and 6 are members of a fourth small group with a common key $k_4$ and node 5 as leader and user A as a fifth small group with a common key $k_A$ and user A as leader.

As shown in FIG. 7A, when all nodes in the multicast group (that is, all nodes $u \in [u_1, u_2, \ldots u_n]_A$) have discovered other nodes in their respective neighborhoods that share a common key (checked in block 708), a node $u_a \in userset(k_a)$ is selected as a leader for each different small group that is formed during the discover protocol process (block 710). Such a node is also referred to here as the "small group leader node." In one implementation of such an embodiment, a flag is set when all nodes in the multicast group $[u_1, u_2, \ldots u_n]_A$ have discovered other nodes in their respective neighborhoods that share a common key. Also, in such an embodiment, it is noted that the criteria noted above requires that each node u belong to at most one small group; therefore, if a node u shares more than one key with its neighbor, only one such common key will be used as an agreement. Further, in such an embodiment, there may be one or more small groups that include only one node, where such a node does not share any keys with its neighbors.

After the discover protocol has been performed by all the nodes in the multicast group, there will often be multiple small groups that do not share a common key. In the embodiment shown in FIGS. 7A-7B, the small group leader node for each small group i formed by the discover protocol establish a shared key with the user A. In the particular embodiment shown in FIG. 7, the small group leader node for small group i transmits its node identifier to the user A (block 712) and calculates $\gamma_{id_i, id_A}$ by performing the processing described above in connection with blocks 530-536 of FIG. 5D (where $\gamma_{id_i, id_A}$ is $\gamma_l$ where node i in the context of FIG. 5D is the small group leader node for small group i and node l is the user A) (block 714). Also, user A calculates $\gamma_{id_A, id_i}$ by performing the processing described above in connection with blocks 530-536 of FIG. 5D (where $\gamma_{id_A, id_i}$ is $\gamma_l$ where node i in the context of FIG. 5D is the user A and node 1 is the small group leader node for small group i) (block 716). The small group leader for small group i transmits to user A a message containing $\gamma_{id_i,id_A}$ (block 718) and user A transmits to the small group leader for small group i a message containing $\gamma_{id_A,id_i}$ (block 720). The user A both generates a common key $K_{id_i,id_A}$ for each small group i by performing an XOR operation on $\gamma_{id_i,id_A}$ and $\gamma_{id_A,id_i}$ (block 722 of FIG. 7B). That is, the user A calculates, for small group i, $K_{id_i,id_A} = \gamma_{id_i,id_A} \oplus \gamma_{id_A,id_i} = K_i \oplus K_A$ (where $K_i$ and $K_A$ are the keys selected for use in calculating $\gamma_{id_i,id_A}$ and $\gamma_{id_A,id_i}$, respectively in the described above in connection with blocks 530-536 of FIG. 5D). As noted above, this process (that is, the processing associated with blocks 712-722) is repeated for the small group leader node of each separate small group i formed by the discover protocol for the multicast group.

After the processing of blocks 712-722 has been performed for the small group leader node of each separate small group i formed by the discover protocol, user A has a common key for the small group leader node of each small group i. Although user A could use each of these separate common keys to separately transmit a multicast group key to the small group leaders, in the embodiment shown in FIGS. 7A-7B, user A forms a key tree by combining pairs of keys for each level of the key tree using a one-way hash function on a concatenation of such keys (block 724). The result of each such combination is a common key for the nodes that are connected by that part of the key tree. Such combining is repeated for each successive higher layer of the key tree until the key tree is complete (that is, until a single "root" common key has been generated) (checked in block 726). That is, where there are keys $K_i$, $K_{i+1}$, $K_{i+2}$, and $K_{i+3}$ for a given level of the key tree, the common keys for the next layer in the key tree are calculated as $K_{i,i+1} = h(K_i \| K_{i+1})$, keys $K_{i+2,i+3} = h(K_{i+2} \| K_{i+3})$. In one implementation of such an embodiment, in the event there are an odd number of keys for a given level $K_i$, $K_{i+1}$, $K_{i+2}$, $K_{i+3}$, and $K_{i+4}$, the common keys for the next layer in the key tree are $K_{i,i+1} = h(K_i \| K_{i+1})$, keys $K_{i+2,i+3} = h(K_{i+2} \| K_{i+3})$, and $K_{i+4}$. The root common key is used for communications within the multicast group.

Figure 4C:
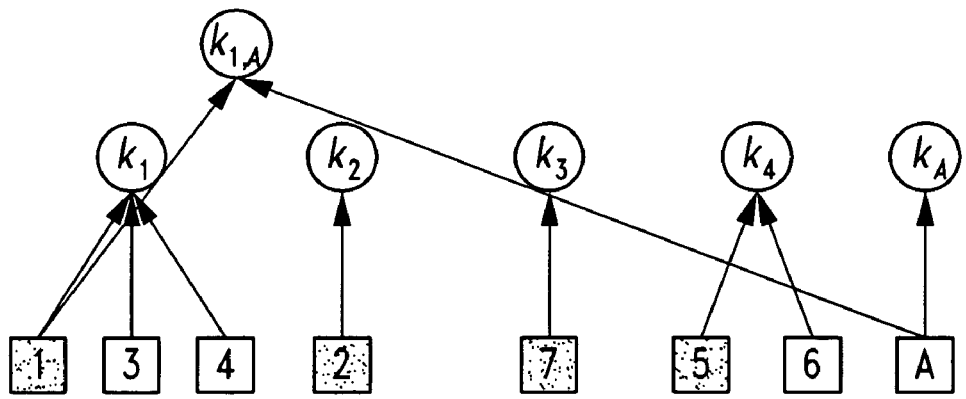
Figure 4D:
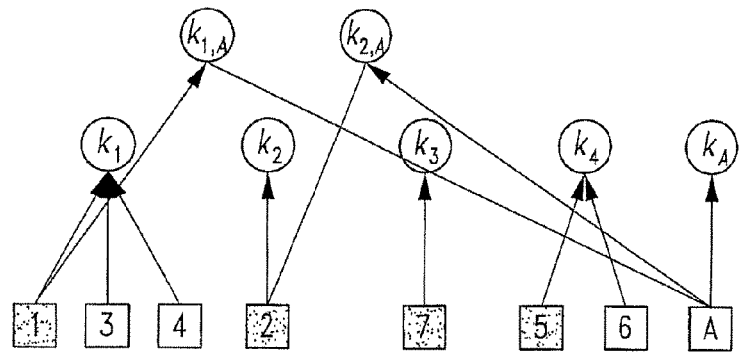
Figure 4E:
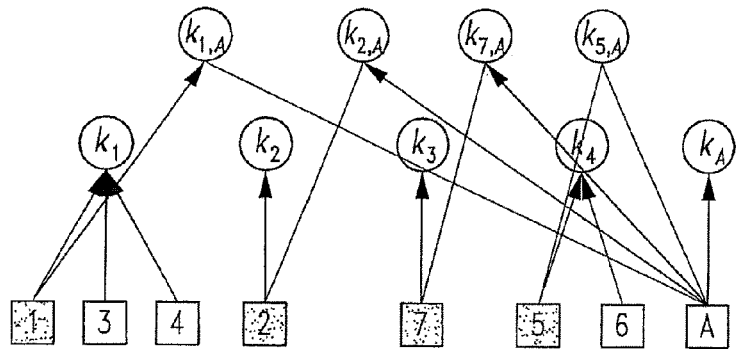

FIGS. 4C-4E illustrate the operation of the processing associated with blocks 712-726 in the context of the example shown in FIGS. 4A-4G. In that example, as shown in FIG. 4C, user A (in connection with the processing of blocks 712-722) combines the key $k_1$ for the first small group with the key $k_A$ for user A using a one-way hash function to calculate the common key $k_{1,A}$ for the leader of the first small group (that is, node 1). In other words, $k_{1,A} = h(k_1 \| k_A)$. As shown in FIG. 4D, user A (in connection with the processing of blocks 712-722) combines the key $k_2$ for the second small group with the key $k_A$ for user A using a one-way hash function to calculate the common key $k_{2,A}$ for the leader of the second group (that is, node 2). Likewise, as shown in FIG. 4E, user A (in connection with the processing of blocks 712-722) combines the key $k_3$ for the third small group with the key $k_A$ for user A using a one-way hash function to calculate the common key $k_{7,A}$ for the leader of the third group (that is, node 7) and combines the key $k_4$ for the fourth small group with the key $k_A$ for user A using a one-way hash function to calculate the common key $k_{5,A}$ for the leader of the fourth group (that is, node 5). Then, in connection with the processing of blocks 724-726, user A forms a key tree as in FIG. 4E. In FIG. 4E, for the purposes of illustration, the common keys $k_{1,A}$, $k_{2,A}$, $k_{7,A}$, and $k_{5,A}$ have been renamed $k_{2,1}$, $k_{2,2}$, $k_{2,3}$, and $k_{2,4}$, respectively. User A creates the next success layer of the key tree by combining common keys $k_{2,1}$ and $k_{2,2}$ using a one-way hash function to calculate the common key $k_{1,1}$ and by combining common keys $k_{2,3}$ and $k_{2,4}$ using a one-way hash function to calculate the common key $k_{1,2}$. User A completes the key tree by creating the root common key $k_{0,0}$ by combining common keys $k_{1,1}$ and $k_{1,2}$ using a one-way hash function.

In the embodiment shown in FIGS. 7A-7B, user A generates the key tree and depends on user A having sufficient resources to do so. In an alternative embodiment, in order to reduce the resource requirements need to generate the key tree, the processing of blocks 712-722 described above as being performed by user A is instead performed by a different group leader in iterations in order to reduce the number of group leaders and to distribute the processing for generating the key tree among user A and the group leaders. In one implementation of such an alternative embodiment, the number of iterations to be performed can be determined at runtime by estimating the capability of the nodes and the size of the multicast group (that is, the number of nodes in the multicast group).

In the embodiment shown in FIGS. 7A-7B, the keys in the key tree are distributed to the nodes of the multicast group (block 728). The keys in the key tree are distributed as follows: Let k0,0 denote the root key for the key tree. Let the keys for each level of the key tree by denominated $k_{level,position\ from\ left}$, so that a key in level 2, that is third from the left is denominated as $k_{2,3}$. So $k_{i,j}$ is parent of $k_{i+1,2j+1}$, for i=0, 1, ... h, and j=0, 1, ... etc. for each level, where h=$\log_2(n)$. Where n is the number of group leaders that is generated by the discovery protocol described above (that is, the processing of blocks 712-722) for all j=0 to n:

$$U_j = userset(k_{0,0}) - \sum_{i=1,k=0}^{i=h,k=2^i-1,k\neq \lceil j/2i \rceil -1} userset(k_{i,k}),$$

$$A \to U_j: \{k'_{i,k}\}_{k_{h,j}}, i = 0, \ldots, h, k \neq \left\lceil \frac{j}{2i} \right\rceil - 1$$

Figure 4F:
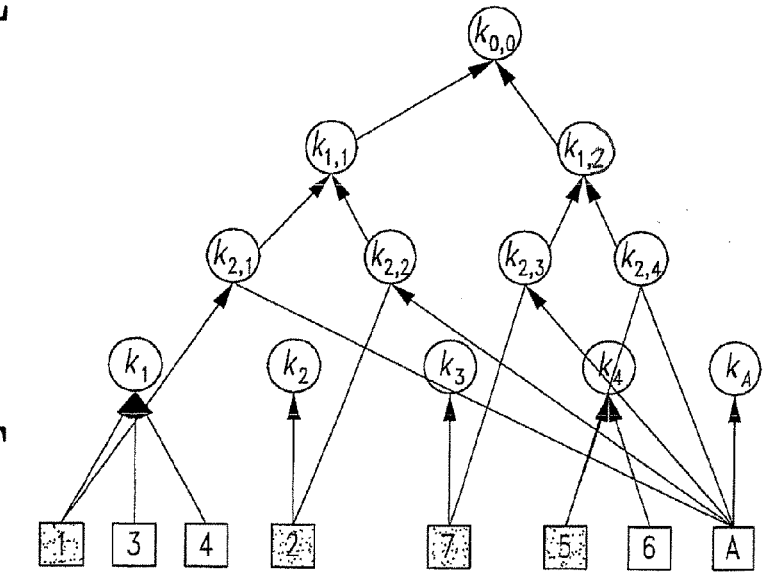
Figure 4G:
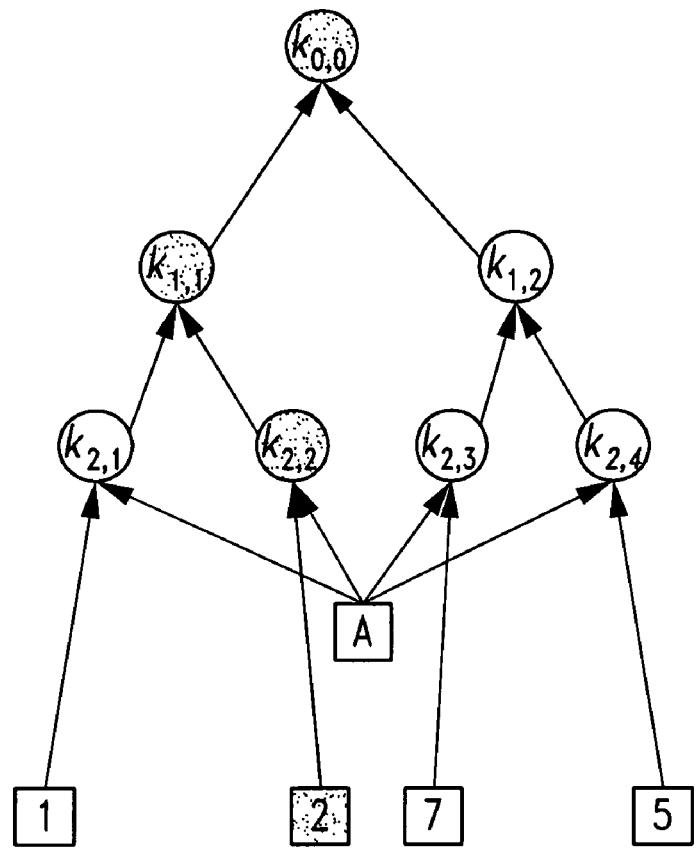

FIG. 4G illustrates which keys from the key tree of FIG. 4F are distributed to node 2 using such a key distribution scheme in the context of the example shown in FIGS. 4A-4G.

Figure 8:
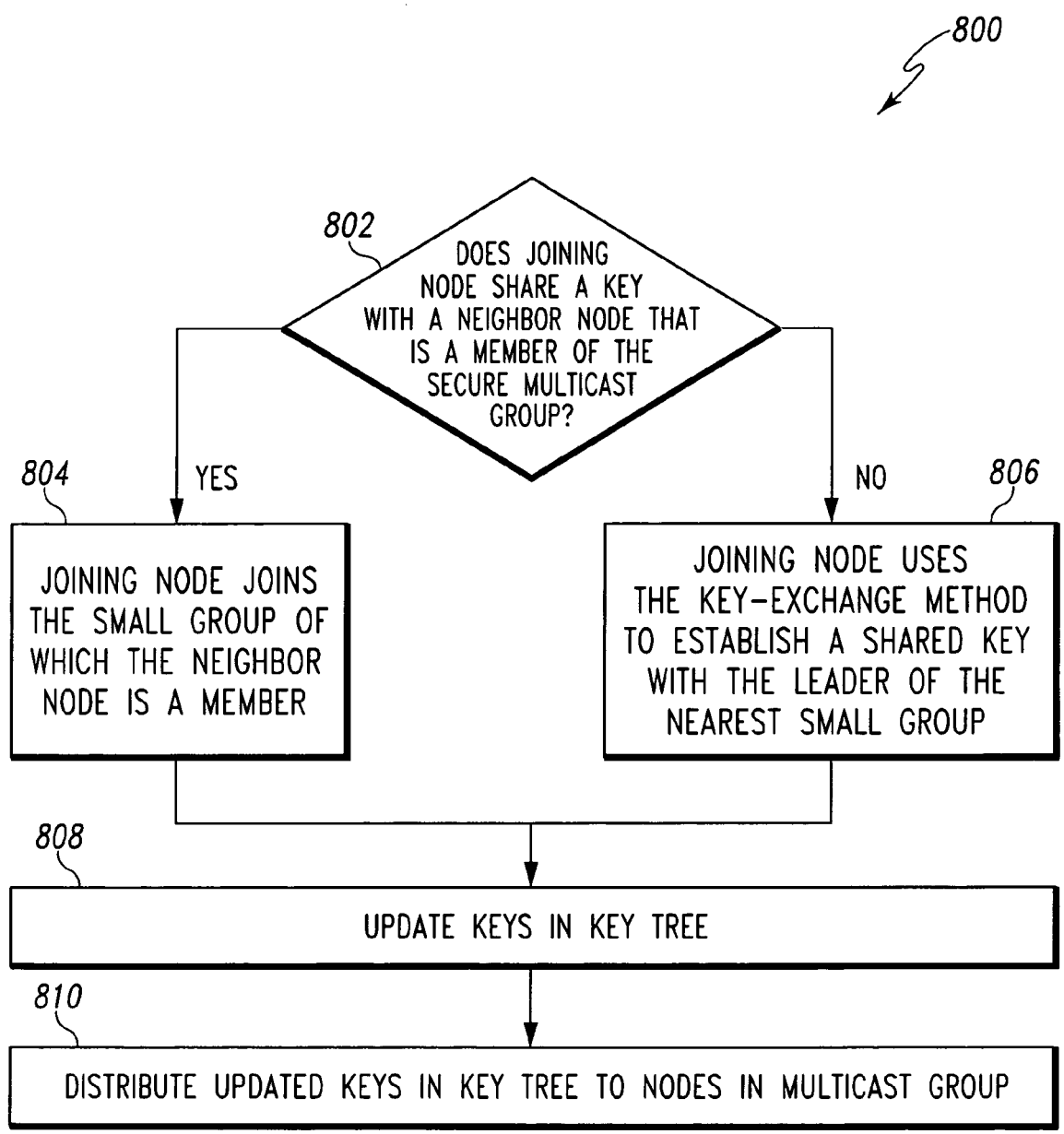
FIG. 8 is a flow diagram of one embodiment of a method 800 of joining a secure group.

FIG. 8 is a flow diagram of one embodiment of a method 800 of joining a secure group. The embodiment of method 800 shown in FIG. 8 is described here as being implemented in the wireless sensor network 100 of FIG. 1 and using the wireless sensor node 102 of FIG. 2 (though it is to be understood that other embodiments are implemented in other ways). Also, the embodiment of method 800 shown in FIG. 8 is described here as being performed after a secure group has been formed using method 700 of FIGS. 7A-7B. In such an embodiment, each method is performed by each wireless sensor node 102 in the network 100. In one implementation of such an embodiment, at least a portion of the processing of method 700 is implemented in software 206 that is executing on each wireless sensor node 102 in the network 100.

The processing of method 800 is performed when a node 102 in the wireless network 100 wishes to join a secure group that has been previously formed (in this embodiment, using method 700 of FIGS. 7A-7B). The node 102 that wishes to join the secure group is also referred to here in the context of FIG. 8 as the "joining" node 102.

When a joining node wishes to join a secure group that has already been formed, the joining node attempts to join a small group that was formed during the secure group formation. When the joining node joins such a small group (and therefore, the secure group), the nodes in the secure group must be re-keyed in order to preserve the forward security property of communications within the secure group. Where the joining node shares a key with a neighbor node that is a member of the secure multicast group (block 802), the joining node joins the "small group" that the neighbor node is a member (block 804). If that is not the case (that is, where the joining node does not share a key with any neighbor node that is member of the secure multicast group), the joining node uses the key-exchange method 540 described above in connection with FIG. 5E to establish a shared key with the leader of the "nearest" small group that was formed during the secure group formation process (block 806). In such an embodiment, the "nearest" small group is the small group that has a leader that is nearest to the joining node. In both cases, after the joining node has joined a small group and has a place in the key graph, all the keys in the traversal path within the key graph starting from the key node associated with the small group joined by the joining node until the root key node are updated (block 810) and the updated keys are communicated to all nodes in the secure multicast group (block 812).

In other words, the processing of method 800 can also, more formally, be described as follows. Let $k_{0,0}$ denote the root key node in the key graph and $k_{h,j}$ denote the point in the key graph where the joining node has joined the secure group (that is, the key node associated with the leader of the small group that the joining node joined). Then, for all i=h down to 1, generate $k_{i,k}'$ as new keys in place of $k_{i,k}$ in the key graph, where $$k = \left\lceil \frac{j}{2i} \right\rceil - 1:$$

$$U_j = userset(k_{0,0}) - \sum_{i=1, k=0}^{i=h, k=2^i-1, k=\lceil j/2i\rceil-1} userset(k_{i,k}),$$

$$A \rightarrow Uj: \{k_{i,k}'\}_{k_{h,j}}, i = 0, \ldots, h, k = \left\lceil \frac{j}{2i} \right\rceil - 1$$

Figure 9:
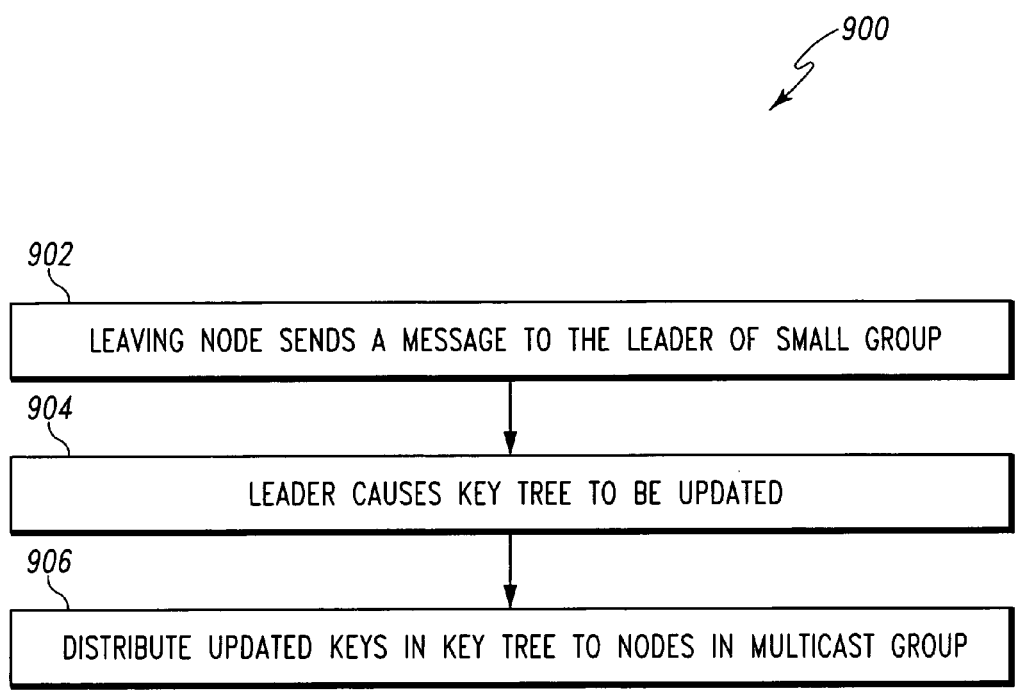
FIG. 9 is a flow diagram of one embodiment of a method 900 of leaving a secure group.

FIG. 9 is a flow diagram of one embodiment of a method 900 of leaving a secure group. The embodiment of method 900 shown in FIG. 9 is described here as being implemented in the wireless sensor network 100 of FIG. 1 and using the wireless sensor node 102 of FIG. 2 (though it is to be understood that other embodiments are implemented in other ways). Also, the embodiment of method 900 shown in FIG. 9 is described here as being performed after a secure group has been formed using method 700 of FIG. 7. In such an embodiment, each method is performed by each wireless sensor node 102 in the network 100. In one implementation of such an embodiment, at least a portion of the processing of method 900 is implemented in software 206 that is executing on each wireless sensor node 102 in the network 100.

The processing of method 900 is performed when a node 102 in the wireless network 100 wishes to leave a secure group that has been previously formed (in this embodiment, using method 700 of FIGS. 7A-7B). The node 102 that wishes to leave the secure group is also referred to here in the context of FIG. 9 as the "leaving" node 102.

When a leaving node wishes to leave a secure group that has already been formed, the leaving node "leaves" the small group that the leaving node was a member of. That is, the leaving node sends a message to the leader of that small group (block 902) and, in response to the message, the leader causes all the keys in the key graph starting from the key node associated with that leader until the root key node to be updated (block 904). The updated keys are communicated to all nodes in the secure multicast group (block 906). The update keys are established so that the leaving node is no longer able to participate in secure communications within the secure group.

Figure 10:
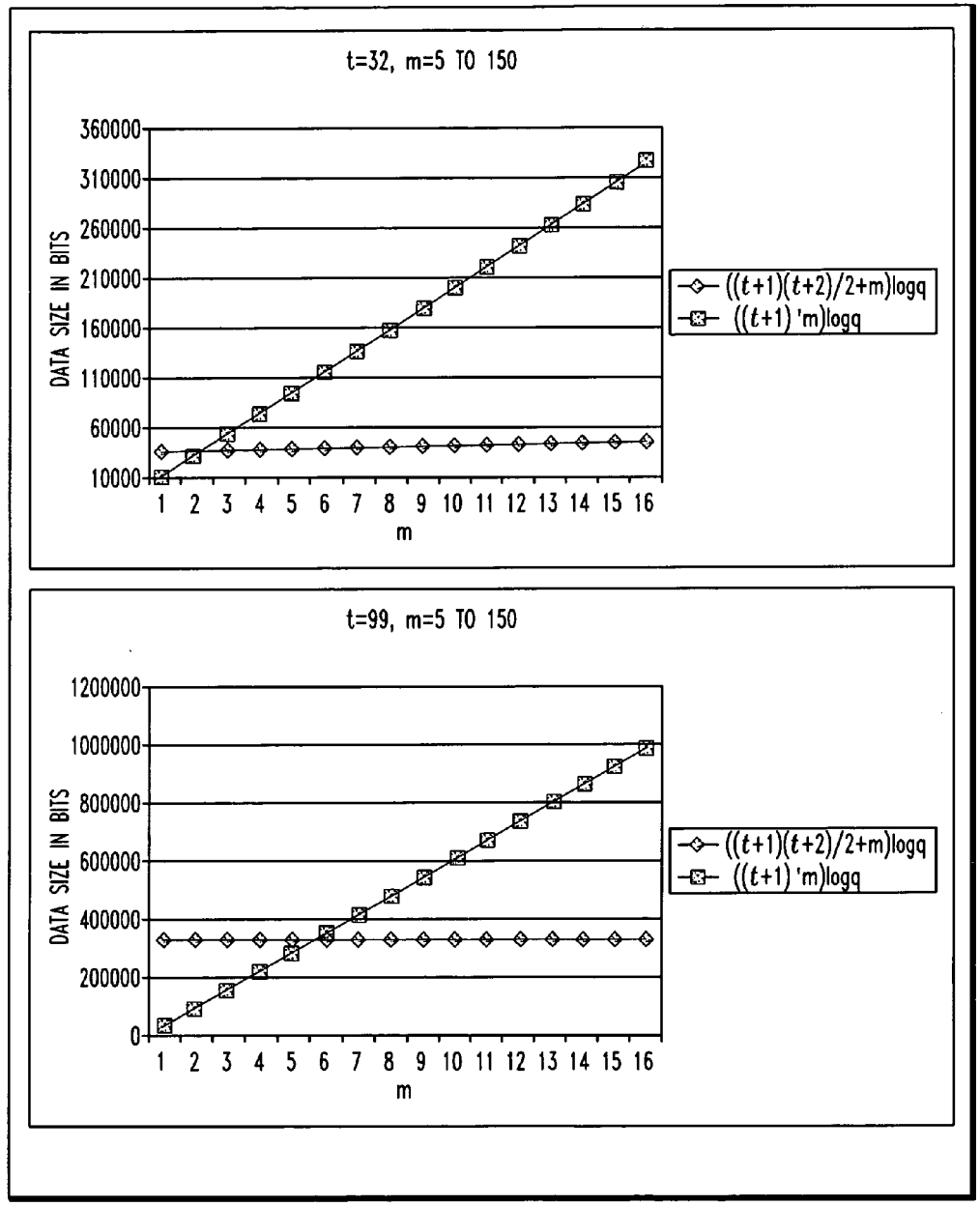
FIG. 10 is a plot showing a comparison of storage space requires using the techniques described herein with a prior art technique.

Embodiments that make use of the methods and techniques described here typically involve a storage costs at each node due to pre-distribution that is equal to $((t+1)(t+2)/2+m)\log_2(q)$ bits. In one example, t is the degree of the bi-variable polynomial that is used, m is the number elements in the key ring, and $q=2^{8i}$ is the key size. In such an example, if 64-bit keys are used, then the plot in FIG. 10 shows the comparison of space for t=32 and t=99, with key space from 5 to 150, for the techniques described here (shown using diamond lines in FIG. 10) as compared to the techniques described in Donggang Liu and Peng Ning, "Establishing pairwise keys in distributed sensor networks," *Proceedings of the 10th ACM Conference on Computer and Communications Security*, 2003, pp. 52-61, where the required size would be $((t+1)m)\log_2(q)$, where t is the degree of the bi-variable polynomial, m is the size of the key space (shown using boxed lines in FIG. 10). When the techniques described here are used, the extra keys that the leaders of each small group at the end of the processing described above in connection with blocks 712-722 of method 700 is equal to one (1). Also, the number of keys node A needs to store is $n(n+1)/2$ in connection with performing the processing described above in connection with blocks 724-728 of method 700, where n is the number of leaders at the end of performing the discovery protocol described above in connection with block 706 of the method 700. This is limited by the space available at node A. However, as noted above, key storage can be distributed by performing multiple iterations of the processing described above in connection with blocks 712-722 of method 700. Moreover, the communication overhead for a join and a leave request up to the leaders is summarized in Table 1.

TABLE 1

| COST OF JOIN AND LEAVE REQUEST | | | |
| --- | --- | --- | --- |
| | The Requesting User | A Non-Requesting User | Node A |
| Join | h-l | d/(d/l) | 2(h-l) |
| Leave | 0 | d/(d/l) | d(h-l) |

The methods, techniques, devices, and/or systems described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of forming a secure group from a plurality of nodes for communicating with a user A, the method comprising performing, by the nodes, a discover protocol, wherein after performing the discover protocol, all nodes belong to at most one smaller subgroup and wherein all nodes in each smaller subgroup share a common key;

selecting a respective leader for each smaller subgroup;

for each of the leaders, generating a respective common key for the user A and that respective leader; and generating a key tree having a plurality of levels, wherein the keys for the lowest level of the key tree are the common keys generated for each leader and wherein the keys for each successive layer are generated by combining pairs of keys from lower levels of the key tree;

wherein at least one key included the key tree is used by nodes in the secure group for communications within the secure group.

2. The method of claim 1, further comprising distributing the keys in the key tree to the nodes.

3. The method of claim 1, wherein each node has a key ring comprising t-elements.

4. The method of claim 3, wherein performing the discover protocol comprises:

for each node, locally broadcasting a key identifier message that includes key identifiers for all of the keys in the key ring of that respective node to the other nodes in a local neighborhood associated with that respective node, wherein each receiving node in the respective local neighborhood that receives the key identifier message checks if a key identifier included in the key identifier message matches a key identifier of a key included in the key ring of the receive node and, if that is the case, the receiving node transmits a message to the broadcasting node indicating that the receiving node would like to join a small group associated with the broadcasting node.

5. The method of claim 4, wherein locally broadcasting a key identifier message that includes key identifiers for all of the keys in the key ring of the respective node does not reveal anything about that key.

6. The method of claim 1, wherein the discover protocol generates a hierarchy of small groups.

7. The method of claim 1, wherein no central authority is used to generate keys.

8. The method of claim 1, further comprising, after initial formation of the secure group, when a joining node wishes to join the secure group:

if that is the case, having the joining node join the respective smaller subgroup of which that neighbor node is a member; and if that is not the case, having the joining node use a key-exchange method to establish a shared key with the respective leader of the smaller subgroup nearest to the joining node.

9. The method of claim 8, further comprising, after the joining node joins the secure group, updating the key tree.

10. The method of claim 9, further comprising, after the joining node joins the secure group and the key tree is updated, distributing the updated keys to the nodes in the secure group.

11. The method of claim 1, further comprising, after initial formation of the secure group, when a leaving node wishes to leave the secure group:

sending a message from the leaving node to the respective leader of the smaller subgroup of which the leaving node is a member;

updating the key tree; and distributing the updated keys to the nodes in the secure group.

12. A system comprising:

performing a discover protocol, wherein after performing the discover protocol, all nodes belong to at most one smaller subgroup and wherein all nodes in each smaller subgroup share a common key;

selecting a respective leader for each smaller subgroup;

for each of the leaders, generating a respective common key for the user A and that respective leader;

and generating a key tree having a plurality of levels, wherein the keys for the lowest level of the key tree are the common keys generated for each leader and wherein the keys for each successive layer are generated by combining pairs of keys from lower levels of the key tree.

13. The system of claim 12, wherein the plurality of nodes are further operable to distribute the keys in the key tree to the nodes.

14. The system of claim 12, wherein each node has a key ring comprising t-elements.

15. The system of claim 14, wherein performing the discover protocol comprises:

if that is the case, the receiving node transmits a message to the broadcasting node indicating that the receiving node would like to join the respective smaller subgroup associated with the broadcasting node.

16. The system of claim 12, wherein the plurality of nodes are further operable to, after initial formation of the secure group, when a joining node wishes to join the secure group:

if that is the case, having the joining node join the respective smaller subgroup of which that neighbor node is a member; and if that is not the case, having the joining node use a key-exchange method to establish a shared key with the respective leader of the smaller subgroup nearest to the joining node.

17. The system of claim 12, wherein each of the plurality of nodes is operable to wirelessly communicate with at least a portion of the plurality of nodes.

18. The system of claim 12, wherein at least one of the plurality of nodes comprises a wireless sensor node.

* * * * *